United States Patent
Datta et al.

(10) Patent No.: US 11,861,053 B2
(45) Date of Patent: Jan. 2, 2024

(54) TECHNIQUES FOR TAMPER DETECTION AND PROTECTION OF A MEMORY MODULE

(71) Applicant: Intel Corporation, Santa Clara, CA (US)

(72) Inventors: Shamanna M. Datta, Hillsboro, OR (US); Asher M. Altman, Bedford, MA (US); John K. Grooms, Webster, MA (US); Mohamed Arafa, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 375 days.

(21) Appl. No.: 17/123,592

(22) Filed: Dec. 16, 2020

(65) Prior Publication Data

US 2021/0103684 A1   Apr. 8, 2021

(51) Int. Cl.
| | | |
|---|---|---|
| *G06F 21/00* | (2013.01) | |
| *G06F 21/87* | (2013.01) | |
| *G06F 21/79* | (2013.01) | |
| *G06F 21/57* | (2013.01) | |

(Continued)

(52) U.S. Cl.
CPC .......... *G06F 21/87* (2013.01); *G06F 12/1433* (2013.01); *G06F 21/575* (2013.01); *G06F 21/79* (2013.01); *G11C 13/0004* (2013.01); *G11C 13/004* (2013.01); *G11C 13/0069* (2013.01)

(58) Field of Classification Search
CPC .... G06F 21/87; G06F 12/1433; G06F 21/575; G06F 21/79; G06F 2221/2143; G06F 21/64; G11C 13/0004; G11C 13/004; G11C 13/0069; G11C 16/22; G11C 29/54; G11C 11/4063

See application file for complete search history.

(56) References Cited

U.S. PATENT DOCUMENTS 9,071,446 B2 *  6/2015  Kreft ..................... H04L 9/3278
10,417,455 B2   9/2019  Couillard et al.
(Continued)

FOREIGN PATENT DOCUMENTS

| EP | 1751798 A1 | 2/2007 |
| WO | 2021041257 A1 | 3/2021 |

OTHER PUBLICATIONS

Rathi et al., "Data privacy in non-volatile cache: Challenges, attack models and solutions", 2016 21st Asia and South Pacific Design Automation Conference (ASP-DAC), Date of Conference: Jan. 25-28 (Year: 2016).*

(Continued)

*Primary Examiner* — Morshed Mehedi
(74) *Attorney, Agent, or Firm* — Compass IP Law PC

(57) ABSTRACT

Techniques for tamper detection of a memory module having non-volatile memory devices resident on a printed circuit board (PCB) by circuitry of a controller also resident on the PCB. Examples include determining resistance values of a character pattern sprayed on a side of a cover facing the non-volatile memory devices using conductive ink following first and second boots of the memory module and asserting a bit of a register to indicate tampering of the memory modules based on a comparison of the resistance values. Tamper policy actions may be initiated based on detection of tampering.

25 Claims, 12 Drawing Sheets

(51) Int. Cl.
*G11C 13/00* (2006.01)
*G06F 12/14* (2006.01)

(56) References Cited

U.S. PATENT DOCUMENTS

| | | | | |
|---|---|---|---|---|
| 2008/0237002 A1* | 10/2008 | Zhang | ................... | B25J 13/084 |
| | | | | 200/61.42 |
| 2008/0284610 A1* | 11/2008 | Hunter | ............ | G06K 19/07372 |
| | | | | 340/657 |
| 2016/0306635 A1* | 10/2016 | Nakajima | ................ | G06F 1/06 |
| 2017/0094819 A1* | 3/2017 | Brodsky | ............... | G06F 1/1656 |
| 2019/0384942 A1* | 12/2019 | Dragone | ............. | H10N 30/875 |

OTHER PUBLICATIONS

Extended European Search Report for Patent Application No. 21198806.8, dated Feb. 22, 2022, 8 pages.

* cited by examiner

REGISTER TABLE 500

| BITS | Type | Indication |
|---|---|---|
| [2:0] | Base_Rvalue | 8 different Ohm ranges |
| [5:3] | Most_Rvalue | 8 different Ohm ranges |
| [6] | Tamper_Flag | Most_Recent_Rvalue compared to Base_Rvalue os outside of tolerance level |
| [7] | Tamper_Deactivated | For Debugging |

DETERMINE, FOLLOWING A FIRST BOOT OF A MEMORY MODULE, A FIRST RESISTANCE VALUE FOR A CHARACTER PATTERN SPRAYED ON A SIDE OF A HEAT SPREADER COVER THAT FACES NON-VOLATILE MEMORY DEVICES RESIDENT ON A FIRST SIDE OF A PCB OF THE MEMORY MODULE, WHEREIN THE CHARACTER PATTERN IS SPRAYED ON USING CONDUCTIVE INK
*1002*

DETERMINE, FOLLOWING A SECOND BOOT OF THE MEMORY MODULE, A SECOND RESISTANCE VALUE FOR THE CHARACTER PATTERN
*1004*

ASSERT A BIT OF A REGISTER ACCESSIBLE TO CIRCUITRY OF A CONTROLLER RESIDENT ON THE FIRST SIDE OR A SECOND SIDE OF THE PCB TO INDICATE TAMPERING OF THE MEMORY MODULE BASED ON THE SECOND RESISTANCE VALUE NOT MATCHING THE FIRST RESISTANCE VALUE WITHIN A THRESHOLD RESISTANCE VALUE
*1006*

*FIG. 10*

Storage Medium 1100

Computer Executable Instructions for 1000

*FIG. 11*

TECHNIQUES FOR TAMPER DETECTION AND PROTECTION OF A MEMORY MODULE

TECHNICAL FIELD

Examples described herein are generally related to techniques for tamper detection and protection of a memory module such as a dual in-line memory module (DIMM).

BACKGROUND

Dual in-line memory modules (DIMMs) are commonly deployed in computing platforms (e.g., servers) to provide system memory. Some types of DIMMs are being designed to include persistent types of memory that include non-volatile memory devices or dies capable of maintaining a state of data following a power down. DIMMs that maintain a state of data following power down may pose a greater security risk to data compared to non-persistent DIMMs that include only volatile memory devices. For example, a non-persistent DIMM loses a state of data on power down and if removed from a computing platform poses little or no security risk to the data results. However, after power down of a persistent DIMM, the state of data is not lost and the DIMM may be removed from the computing platform and attempts could be made to extract the data from non-volatile memory devices.

BRIEF DESCRIPTION OF THE DRAWINGS

FIG. 5 illustrates an example register table.
FIG. 10 illustrates an example third logic flow.
FIG. 11 illustrates an example storage medium.

DETAILED DESCRIPTION

As contemplated by this disclosure, persistent DIMMs that maintain a state of data following power down may pose a greater security risk to data compared to non-persistent DIMMs that include only volatile memory devices. Some techniques to mitigate these risks may include use of tamper resistant tape wrapped around a memory module such as a persistent DIMM. Any tampering of the memory module may be detected by visual inspection of the tamper resistant tape. For example, broken tape portions causing color changes around the broken tape portions. However, some types of persistent DIMMs such as those including byte or block addressable types of non-volatile memory having a 3-dimensional (3-D) cross-point memory structure that includes, but is not limited to, chalcogenide phase change material (e.g., chalcogenide glass) hereinafter referred to as "3-D cross-point memory", may have operational thermal properties that may make tamper resistant tape ineffective (e.g., it melts) and/or interfere with thermal heat mitigation. Even if tamper resistant tape could be designed to work with operational thermal properties of persistent DIMMs having chalcogenide 3-D cross-point memory, these tape techniques may be incapable of providing any type of electronic detection and signaling. Further, tamper resistant tape only provides a visual indication of tampering and does not prevent an adversary from extracting data.

Other techniques may include tamper mechanisms such a tamper switches. The tamper switches may be triggered responsive to mechanical disturbances when an adversary attempts to physically tamper with a memory module. Once trigged, the tamper switch activates tamper circuitry to erase data. These tamper mechanism techniques may have limited reliability and sensitivity. For example, setting the trigger to capture relatively small mechanical disturbances may result in triggering the tamper switch during normal operation. Yet adjusting the trigger to higher levels of mechanical disturbance may increase the likelihood of an adversary defeating tamper switches.

A type of exotic tamper mechanism used in military or high security government intelligence agencies may include tamper vibration sensors in a memory module. Triggering of a tamper vibration sensors causes a controlled explosion that physically shatters the memory module. An explosive shattering of a memory module may protect data but it destroys the memory module and may not be a suitable solution for most types of operations that may use persistent DIMMs.

Figure 1:
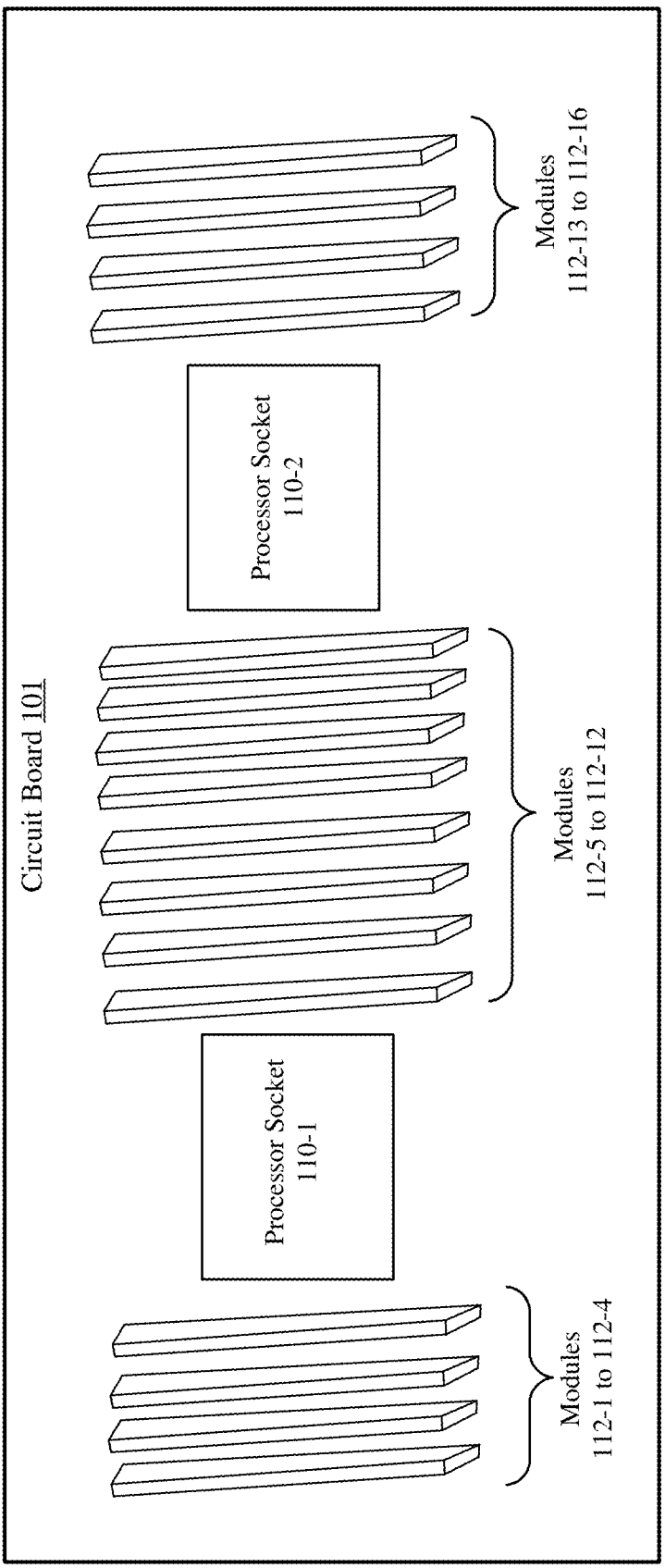
FIG. 1 illustrates an example system.

FIG. 1 illustrates an example system 100. In some examples, as shown in FIG. 1, system 100 includes a circuit board 101 (e.g., a printed circuit board). As shown in FIG. 1, circuit board 101 may include processors sockets 110-1 and 110-2 and modules 112-1 to 112-16. System 100, for example, may be included in a computing platform that includes, but is not limited to, a server. For these examples, modules 112-1 to 112-16 may be configured as DIMMs inserted in slots (not shown) on circuit board 101. Modules 112-1 to 112-16 may be configured as DIMMs in a similar form factor as DIMMs described in one or standards promulgated by the Joint Electron Device Engineering Council (JEDEC). For example, JEDEC described DIMM form factors associated with JESD79-4A (DDR4) or JESD 79-5 (DDR5) standards.

Modules 112-1 to 112-16 may include only persistent DIMMs or may include any combination of persistent and non-persistent DIMMs. In one example, modules 112-1 to 112-7 may be arranged to couple with a first processor (not shown) inserted in processor socket 110-1 and modules 112-8 to 112-16 may be arranged to couple with a second processor (not shown) inserted in processor socket 110-2. As described in more details below, persistent memory modules included in modules 112-1 to 112-16 may be manufactured to include a combination of passive and active tamper detection elements to protect data stored in non-volatile memory devices resident on these persistent memory modules. The data, for example, generated by first or second processors inserted in processor sockets 110-1 and 110-2 while these processors execute an application or process an application workload.

Figure 2:
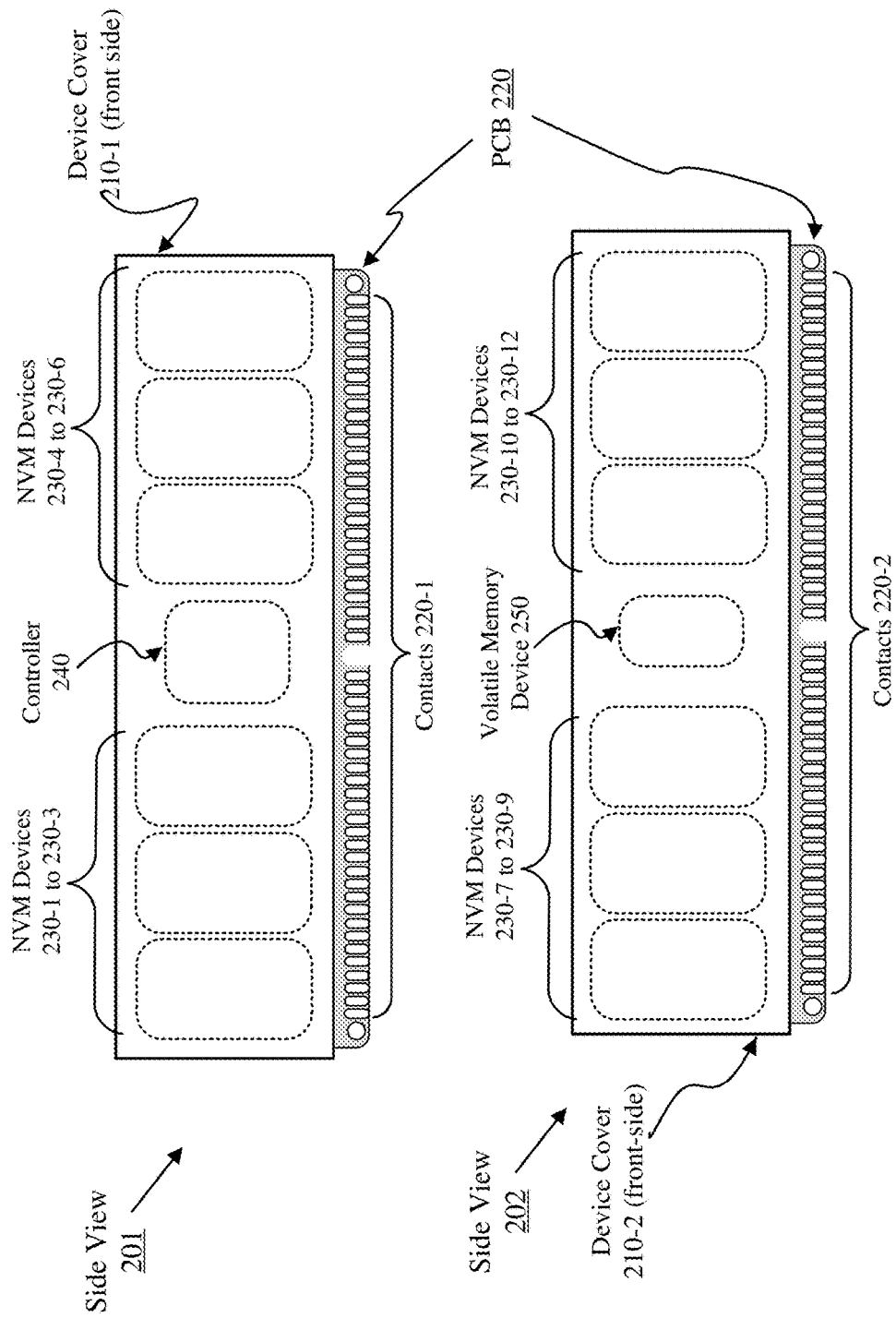
FIG. 2 illustrates first example views of a module.

FIG. 2 illustrates first example views of a module 200. In some examples, as shown in FIG. 2, the first example views include a side view 201 and a side view 202 that depict views of two separate sides of module 200. As shown in FIG. 1, side view 201 shows a device cover 210-1. Dashed lines for non-volatile memory (NVM) devices 230-1 to 230-6 indicate these memory devises are located behind (not visible) device cover 210-1. Dashed lines for controller 240 indicates that controller 240 is also located behind device cover 210-1. NVM devices 230-1 to 230-6 and controller 240 may be attached to or couple with a printed circuit board (PCB) 220, a portion of which is visible at the bottom edge of module 200. Side view 201 also shows contacts 220-1 that may couple with a first set of contacts include in a slot of a circuit board (e.g., circuit board 110). Module 200 may be in a similar form factor as a DIMM described in one or more JEDEC standards such as but not limited to the JESD79-4A (DDR4) standard or the JESD 79-5 (DDR5) standard. Contacts 240-1 may be arranged in a similar manner as described in the JESD79-4A (DDR4) or JESD 79-5 (DDR5) standards.

As shown in FIG. 1, side view 202 shows a device cover 210-2. Dashed lines for non-volatile memory (NVM) devices 230-7 to 230-12 also indicate these memory devises are located behind (not visible) device cover 210-2. Dashed lines for volatile memory device 250 also indicate that volatile memory device 250 is located behind device cover 210-2. NVM devices 230-1 to 230-6 and volatile memory device 250 may attached to or couple with PCB 220, a portion of which is visible at the bottom edge of module 200. Side view 202 shows contacts 220-2 that may couple with a second set of contacts include in a slot of a circuit board (e.g., circuit board 110). As mentioned above for contacts 220-1, contacts 220-2 may be arranged in a similar manner as described in the JESD79-4A (DDR4) or JESD 79-5 (DDR5) standards.

In some examples, device cover 210-1 and device cover 210-2 may serve as heat spreaders to facilitate dissipation of thermal energy generated from NVM devices 230-1 to 230-12, controller 240 or volatile memory device 250 while module 200 is in operation (e.g., powered on). For these examples, device covers 210-1 and 210-2 may be a type of metal plate or other type of material capable of absorbing and dissipating at least a portion of the generated thermal energy. An example type of metal may include, but is not limited to, anodized aluminum.

According to some examples, volatile memory device 250 may serve as a type of buffer or cache for read or write access to NVM devices 230-1 to 230-12. Although not shown in FIG. 3, module 200 may include power loss imminent (PLI) circuitry (e.g., batteries and/or capacitors—not shown) to enable data stored in volatile memory device 250 to be moved to non-volatile memory devices as part of an expected or unexpected power down or power loss event. An ability to preserve data responsive to a PLI event may classify module 200 as a type of persistent memory module.

As disclosed herein, reference to a non-volatile memory devices such as NVM devices 230-1 to 230-12 may include one or more different non-volatile memory types that may be byte or block addressable types of non-volatile memory such as 3-D cross-point memory. Non-volatile types of memory may also include other types of byte or block addressable non-volatile memory such as, but not limited to, single or multi-level phase change memory (PCM), resistive memory, nanowire memory, ferroelectric transistor random access memory (FeTRAM), anti-ferroelectric memory, resistive memory including a metal oxide base, an oxygen vacancy base and a conductive bridge random access memory (CB-RAM), a spintronic magnetic junction memory, a magnetic tunneling junction (MTJ) memory, a domain wall (DW) and spin orbit transfer (SOT) memory, a thyristor based memory, a magnetoresistive random access memory (MRAM) that incorporates memristor technology, spin transfer torque MRAM (STT-MRAM), or a combination of any of the above.

As disclosed herein, reference to a volatile memory devices such as volatile memory device 250 may include one or more different volatile memory types. Volatile types of memory may include, but are not limited to, random-access memory (RAM), Dynamic RAM (DRAM), double data rate synchronous dynamic RAM (DDR SDRAM), static random-access memory (SRAM), thyristor RAM (T-RAM) or zero-capacitor RAM (Z-RAM).

Figure 3:
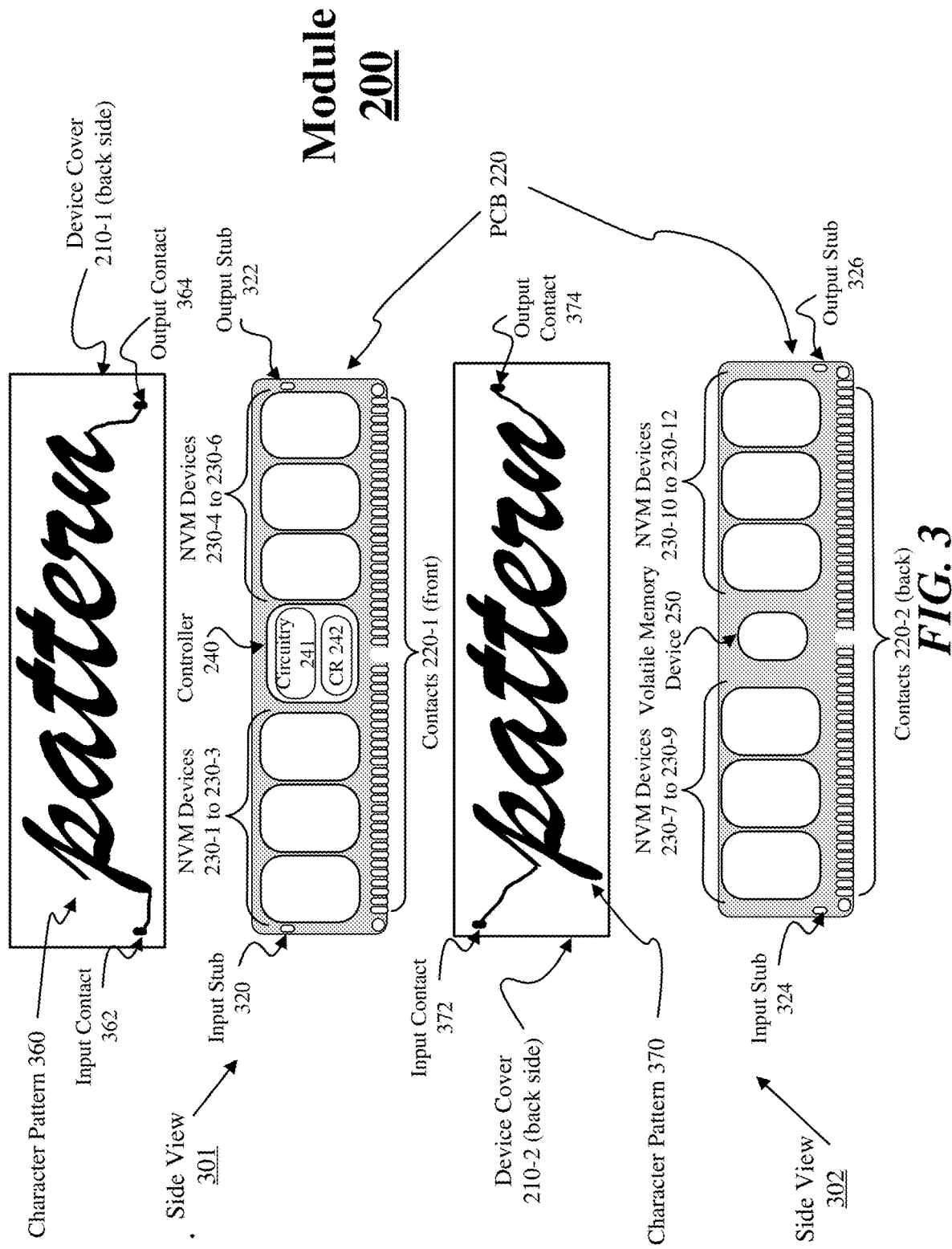
FIG. 3 illustrates second example views of the module.

FIG. 3 illustrates second example views of module 200. In some examples, as shown in FIG. 3, the second example views include a side view 301 and a side view 302 that depict views of two separate sides of module 200 with respective device covers 210-1 and 210-2 removed and flipped to show a back-side. For these example, device cover 210-1 may have a character pattern 360 and device cover 210-2 may have a character pattern 370. Character patterns 360 and 370 may be a same pattern or separate patterns that represent per-module unique character patterns that may be generated during manufacture and/or assembling of module 200 by spraying, painting, or drawing a conductive ink on a back side of respective device covers 210-1 and 210-2. The per-module unique character patterns, for example, may include alphabetic characters, number characters or symbol characters. The characters included in the per-module unique character pattern may be arranged in a pattern that connects the characters to enable a current to flow from an input contact to an output contact. For example, from input contact 362 to output contact 364 for character pattern 360 or from input contact 372 to output contact 374 for character pattern 370. The conductive ink may include, but is not limited to, carbon ink, a conductive polymer ink, or a metal nanoparticle ink (e.g., copper, silver or gold). In some examples, the conductive ink may be a color that matches the back side color of device covers 210-1 and 210-2 or is clear/colorless to make character patterns 360 and 370 nearly invisible. The black "pattern" shown in FIG. 3 is shown to more clearly depict connected characters sprayed, painted, or drawn on the back side of device covers 210-1 and 210-2.

According to some examples, as shown in FIG. 3, side view 301 shows that PCB 220 includes an input stub 320 and an output stub 322. For these examples, input stub 320 is to connect to input contact 362 and output stub 322 is to connect to output contact 364 when device cover 210-1 is placed over PCB 220. Device cover 210-1 may be placed to be in close contact with NVM devices 230-1 to 230-6. Input stub 320 and output stub 322 may be of sufficient height to rise above the height of NVM devices 230-1 to 230-6 in order to couple with respective input contact 362 and output contact 364. As described in more details below, controller 240 includes circuitry 241. Circuitry 241 may include circuitry or logic to determine a resistance value for character pattern 360 based on an applied input voltage and corresponding input current through input stub 320/input contact 362, character pattern 360 and resulting output voltage and current outputted through output contact 364/output stub 322. Also, as described more below, controller 240 may include a control register (CR) 242 that is used by the circuitry or logic of circuitry 241 to store the determined resistance value for character pattern 360. In some examples, circuitry 241 of controller 240 may include additional circuits or logic such as, but not limited to, an analog to digital converter (ADC) (not shown) to convert measured resistance values into a number (digital format) that is then stored by circuitry 241 in CR 242. For these examples, these digital values may be several bits long (e.g., 32-64 bits) and may provide fine-grained custom formatted digital values.

According to some examples, as shown in FIG. 3, side view 302 shows that PCB 220 includes an input stub 324 and an output stub 326. For these examples, input stub 324 is to connect to input contact 372 and output stub 326 is to connect to output contact 374 when device cover 210-2 is placed over PCB 220. Similar to device cover 210-1, device cover 210-2 may be placed to be in close contact with NVM devices 230-7 to 230-12. Input stub 324 and output stub 326 may be of sufficient height to rise above the height of NVM devices 230-7 to 230-12 in order to couple with respective input contact 372 and output contact 374. As described more below, circuitry 241 of controller 240 may include circuitry or logic used to implement booting or power up actions of module. These actions may include determining a resistance value for character pattern 370 based on a voltage and current applied through input stub 324/input contact 372, character pattern 370 and output contact 374/output stub 326. As described more below, CR 242 may also be used by the boot related circuitry or logic of circuitry 241 to store the determined resistance value for character pattern 370.

Figure 4:
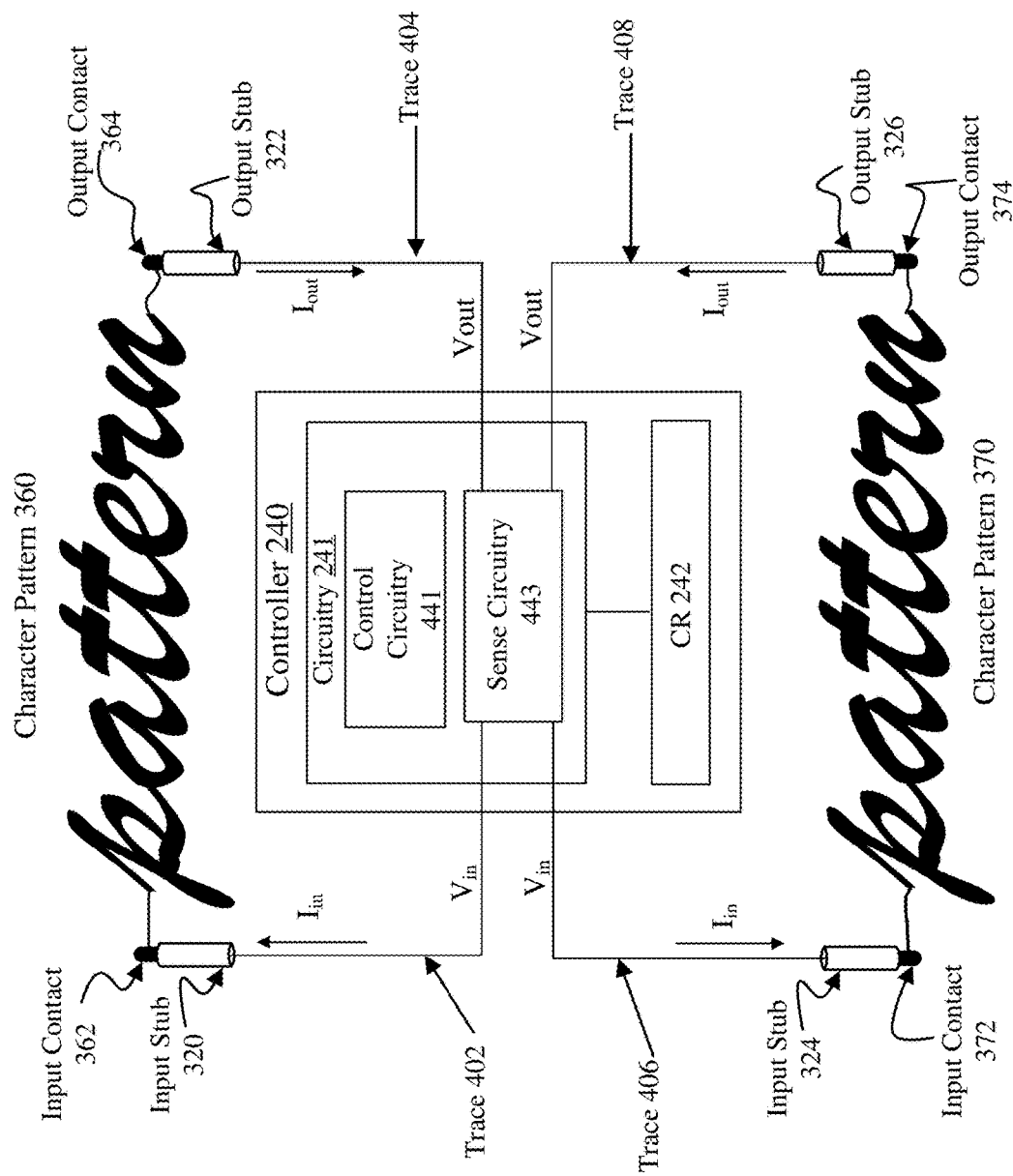
FIG. 4 illustrates a first example of sub-system to measure resistance of character patterns.

FIG. 4 illustrates a first example a sub-system 400 to measure resistance of character patterns 360 and 370. For this first example, sub-system 400 is included in module 200 and includes controller 240, circuitry 241, CR 242, input stubs, 320, 324, output stubs 322, 326, input contacts 362, 372, output contacts 364, 374 and character patterns 360, 370 as shown in FIG. 3 and described above. For these examples, sub-system 400, as shown in FIG. 4, also includes traces 402, 404 (e.g., metal traces) that allow for an input voltage ($V_{in}$) and an input current ($I_{in}$) to be applied through input stub 320/input contact 362 and then through character pattern 360 to result in an output voltage ($V_{out}$) and an output current ($I_{out}$) through output contact 364/output stub 322. Sub-system 400, as shown in FIG. 4, also includes traces 406, 408 (e.g., metal traces) that allow for a $V_{in}$ an $I_{in}$ to be applied through input stub 324/input contact 372 and then through character pattern 370 to result in a $V_{out}$ and an $I_{out}$ through output contact 374/output stub 326.

In some examples, as shown in FIG. 4, circuitry 241 of controller 240 includes control circuitry 441 and sense circuitry 443. Sense circuitry 443 may include circuitry or logic to cause a $V_{in}$ to be applied that causes an $I_{in}$ to flow via trace 402 through input stub 320 and input contact 362. Current may then flow across character pattern 360 and an $I_{out}$ flows through output contact 364 and output stub 322 and is outputted via trace 404. Sense circuitry 443 may measure $V_{out}$ and $I_{out}$ on trace 404. In some examples, control circuitry 441 may obtain the measured $V_{out}$ and $I_{out}$ and determine a resistance value ($R_{value}$) for character pattern 360 based on $R_{value} = V_{out}/I_{out}$. Control circuitry 441 may then cause the determined $R_{value}$ to be stored to CR 242. For example, as described more below, CR 242 may have bits that can be selectively set to indicate the determined $R_{value}$ for character pattern 360. In other examples, sense circuitry 443, rather than control circuitry 441, may determine $R_{value}$ and selectively set the bits of CR 242 to indicate the determined $R_{value}$.

According to some examples, sense circuitry 443 may cause a $V_{in}$ to be applied that causes an $I_{in}$ to flow via trace 406 through input stub 324 and input contact 372. Current may then flow across character pattern 370 and an $I_{out}$ flows through output contact 374 and output stub 326 and is outputted via trace 408. Sense circuitry 443 may measure $V_{out}$ and $I_{out}$ on trace 408. In some examples, control circuitry 441 may obtain the measured $V_{out}$ and $I_{out}$ and determine an $R_{value}$ for character pattern 370 based on $R_{value} = V_{out}/I_{out}$. Control circuitry 441 may then cause the determined $R_{value}$ to be stored to CR 242. In other examples, sense circuitry 443, rather than control circuitry 441, may determine $R_{value}$ and cause the determined $R_{value}$ to be stored to CR 242. As mentioned briefly above, circuitry 241 may include an ADC. The ADC may convert the determined $R_{value}$ into a number and cause the number to be stored to CR 242.

In some examples, respective $R_{values}$ for character patterns 360 and 370 may be initially determined during manufacturing of module 200. For these examples, upon a first boot or power up of module 200 the $R_{values}$ for character patterns 360 and 370 are determine and then stored to CR 242 as a base $R_{values}$. As described more below, the base $R_{values}$ for character patterns 360 and 370 may be used to compare to $R_{values}$ determined following subsequent boots or power ups of module 200 and then enact tamper protocols or policies if the comparison indicates a difference in $R_{values}$ that is greater than a threshold amount. In other words, a difference that indicates possible tampering. The possible tampering may have included removal of device cover 210-1 or device cover 210-2. The removal of device covers 210-1 or 210-2 may have caused at least portions of respective character patterns 360 or 370 to be altered (e.g., some of the conductive ink scrapped off). In some examples, adhesive or sticky material may attach device covers 210-1 to 210-2 to memory device and breaking that attachment may increase the likelihood that character patterns 360 or 370 are altered upon removal of device covers 210-1 or 210-2. As a result of being altered, determined $R_{values}$ for character pattern 360 or 370 may noticeably change between boots of module 200.

FIG. 5 illustrates an example register table 500. In some examples, as shown in FIG. 5, register table 500 may be for an 8 bit register (examples are not limited to an 8 bit register). For these examples, the 8 bit register includes a Base_$R_{value}$ in bits [2:0]. Bits [2:0] may be selectively asserted to indicate up to 8 resistance ranges for a character pattern or patterns measured following a first boot of a module such as module 200. For example, each range may cover a range of 0.01 ohms (e.g., 0.040 to 0.049, 0.050 to 0.059, etc.). The 8 bit register also includes Most_Recent_$R_{value}$ in bits [5:3]. Bits [5:3] may be selectively asserted to indicate up to 8 resistance ranges for a character pattern or patterns measured following a most recent boot of the module. The 8 bit register also includes Tamper_Flag in bit [6]. Bit [6] may be asserted if logic and/or circuitry of a controller for the module determines that a comparison of the Base_$R_{value}$ indicated in bits [2:0] to the Most_Recent_$R_{value}$ indicated in bits [5:3] indicates tampering of the module. In some examples, a Tamper_Flag indication may also be saved in some portion of non-volatile memory to permanently advertise that a module has been tampered with. This permanent advertisement may be used for future forensic investigations. In other examples, the controller may cause a programmable fuse bit may activated to indicate tampering of the memory module. As described more below, asserting bit [6] may be an initial part of tamper protocols or policies enacted based on detected tampering. The 8 bit register also includes Debug_Flag in bit [7]. As described more below, bit [7] may be asserted to disable any tamper response actions (but not detection) to allow for debugging of the module. In some examples, bit [7] may only be asserted via a tightly controlled debug interface that allows only authorized access to cause logic and/or features of the controller for the module to assert or de-assert bit [7]. In some examples, tightly controlled debug interface may only allow or limit disabling of tamper response in relation to a pre-manufacturing life cycle of the module.

Figure 6:
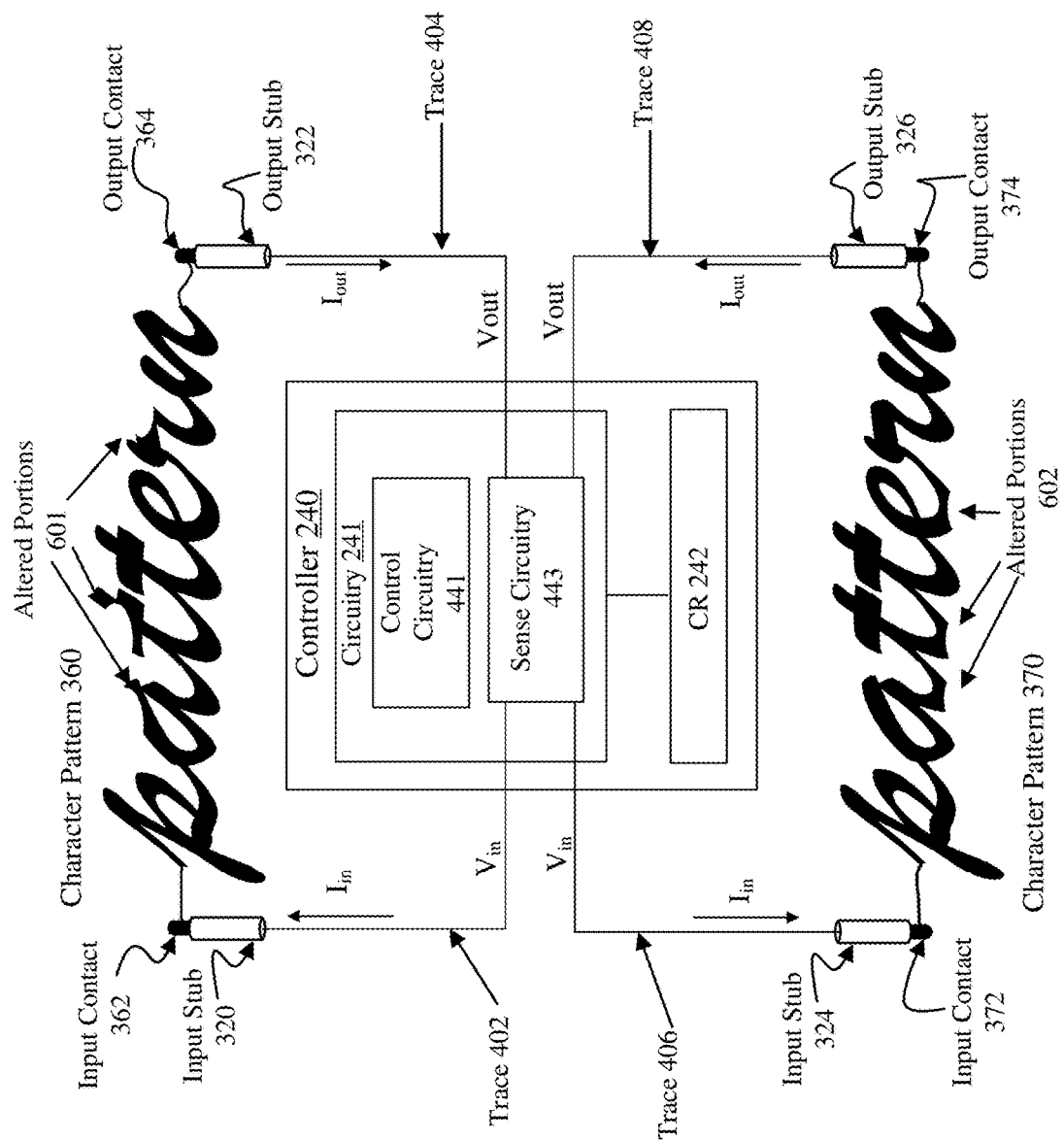
FIG. 6 illustrates a second example of the sub-system to measure resistance of the character patterns.

FIG. 6 illustrates a second example of sub-system 400 to measure resistance of character patterns 360 and 370.

According to some example, the second example of sub-system 400 is post manufacturing or a non-first boot of module 200. For example, a boot up in a computing platform deployed in a data center. For these examples, as shown in FIG. 6, character pattern 360 includes altered portions 601 that includes the "a", first "t" and "r" of "pattern" being slightly altered. Also, character pattern 370 includes altered portions that includes altered portions 602 that includes the "a", first "t" and "e" of "pattern" being slightly altered. These alterations may have resulted in some conductive ink being scraped off during removal of device covers 240-1 and 240-2. Further alterations may have also resulted when the device covers 240-1 and 240-2 were placed back over NVM devices 230-1 to 230-12.

According to some examples, $R_{values}$ for character patterns 360 and 370 with respective altered portions 601 and 602 as shown in FIG. 6, are determined by logic and/or features of controller 240 as described above for sub-system 400. For these examples, controller 240 may selectively assert bits [5:3] of CR 242 to record the $R_{value}$ as a Most_Recent_$R_{value}$. Logic and/or features of controller 240 (e.g., control circuitry 441 implementing firmware logic) may obtain the Base_$R_{value}$ from bits [2:0] of CR 242 and compare to the Most_Recent_$R_{value}$. For this example, the comparison will show that altered portions 601 and 602 caused a detectable change (e.g., a delta>0.01 ohms) in $R_{values}$ since manufacturing. The logic and/or features of controller 240 may then assert bit [6] of CR 242 to indicate that tampering has been detected. The assertion of bit [6] of CR 242 serves as an immutable bit that indicates module 200 has been tampered with since manufacturing and on subsequent boots of module 200 tamper policies may be implemented. These tamper policies may include, but are not limited to, alerting of a tamper detection, causing all data stored to NVM devices 230-1 to 230-12 to be erased, preventing/restricting decryption of data stored to NVM devices 230-1 to 230-12, or deactivating module 200. In some examples, certain flavors of tamper detection and resistance policies may be allowed to be re-configured by a user during the user's first boot (e.g., as an opt-in mechanism).

Figure 7:
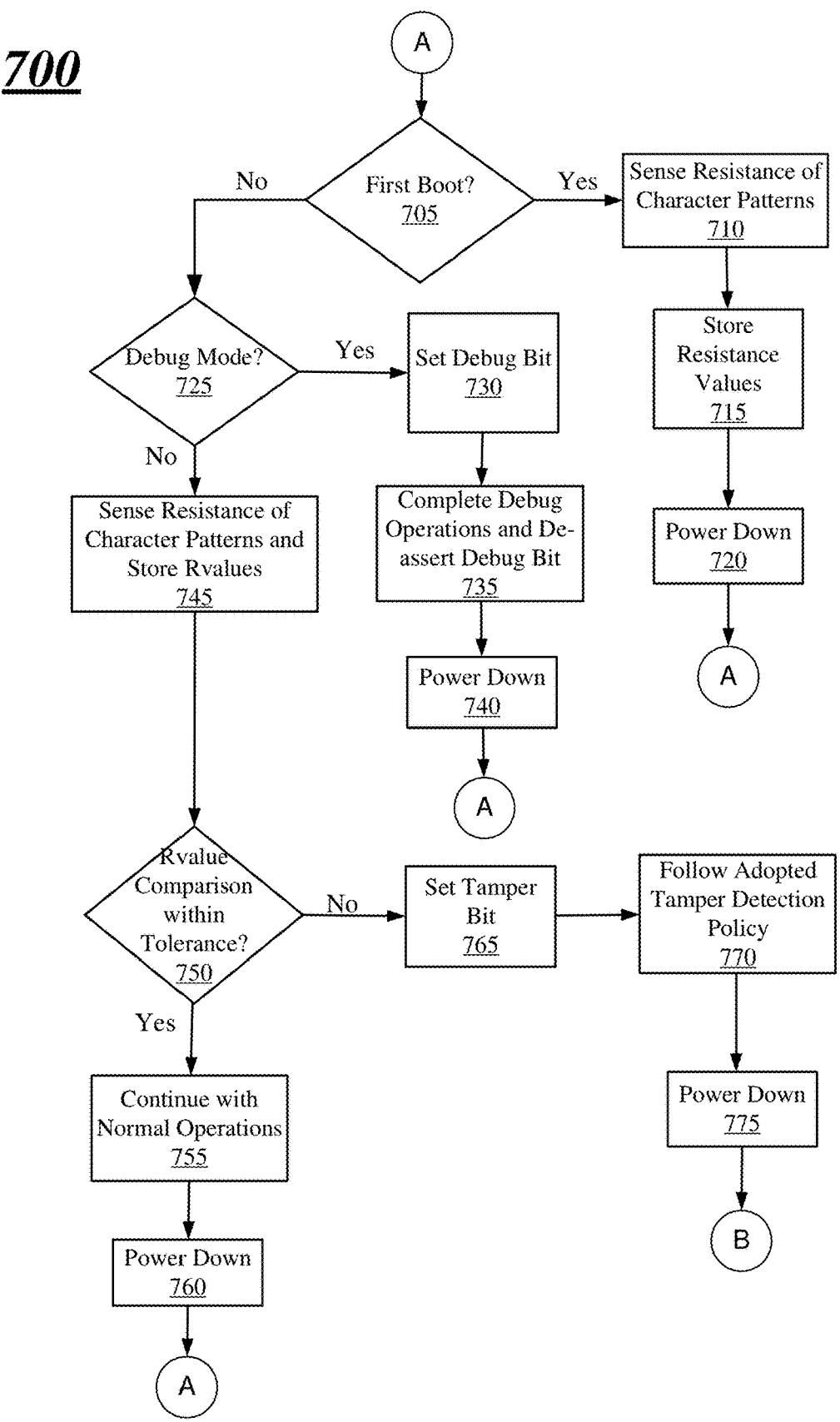
FIG. 7 illustrates an example first logic flow.

FIG. 7 illustrates an example logic flow 700. In some examples, logic flow 700 may illustrate actions by logic and/or features of a controller for a persistent memory module. For these examples, logic flow 700 may be implemented by circuitry and/or logic of a controller for a persistent memory module such as circuitry 241 included in controller 240 of module 200 as mentioned above for FIGS. 2-6. Also, a control register used by the circuitry and/or logic of the controller may be set or programmed as indicated in register table 500 mentioned above for FIG. 5. The registers may be set or programmed by control circuitry 441 or sense circuitry 443 of circuitry 241 as shown in FIG. 4 or 6. Examples are not limited to circuitry 241 included in controller 240 as shown in FIGS. 2-4 and 6 or to register bits indicated in register table 500 shown in FIG. 5 to implement at least portions of logic flow 700.

Starting at decision block 705, a determination is made as to whether a module is being booted for the first time. For example, initial boot or power up following assembly at a manufacturer. If a first boot, logic flow 700 moves to block 705. Otherwise, logic flow 700 moves to block 725.

Moving from block 705 to block 710, sense circuitry 443 of controller circuitry 241 senses resistance of character patterns 360 and 370 sprayed on a backside of device covers 240-1 and 240-2 (e.g., heat spreader plates) covering NVM devices 230-1 to 230-12.

Moving to block 715, control circuitry 441 of circuitry 241 may assert bits [0:2] of CR 242 to indicate Base_$R_{values}$.

Moving to block 720, module 200 is powered down. In some examples, the power down may follow other operations unrelated to tamper detection.

Moving from decision block 705 to decision block 725, control circuitry 441 may determine whether module 200 has been placed in a debug mode. If in debug mode, logic flow 700 moves to block 730. Otherwise, logic flow 700 moves to block 745

Moving from decision block 725 to block 730, control circuitry 441 may assert bit [7] of CR 242 to indicate that module 200 is in a debug mode.

Moving to block 735, debug operations are completed for module 200 and bit [7] of CR 242 is de-asserted to indicate that module 200 is no longer in a debug mode.

Moving to block 740, module 200 is powered down.

Moving from decision block 725 to block 745, sense circuitry 443 senses resistance of character patterns 360 and 370 and control circuitry 441 determines $R_{values}$ asserts bits [3:5] of CR 242 to store Most_Resent_$R_{values}$ for patterns 360 and 370.

Moving to decision block 750, control circuitry 441 of control circuitry 441 may implement firmware to compare the Base_$R_{values}$ maintained in bits [2:0] of CR 242 to Most_Recent_$R_{values}$ maintained in bits [3:5] to determine whether the most recent $R_{values}$ of patterns 360 and 370 are within a predetermined tolerance (e.g., within 0.01 olms of each other). If the compared $R_{values}$ are within the predetermined tolerance, logic flow 700 moves to block 755. Otherwise, logic flow 700 moves to block 765.

Moving to block 755, module 200 continues with normal operation. In other words, no tamper detection protocols or policies are activated.

Moving to block 760, module 200 is powered down.

Moving from decision block 750 to block 765, control circuitry 441 may set or assert bit [6] of CR 242 to indicate detection of tampering of module 200.

Moving to block 770, module 200 continues with following an adopted tamper detection policy. In some examples, following the adopted tamper detection policy may occur during next boot. In any case, module 200 will not allow access to previously stored data maintained in NVM devices 230-1 to 230-12 when tamper is detected.

Moving to block 775, module 200 is powered down. In some examples, logic flow 700 moves to a logic flow 800 (B) shown in FIG. 8 rather moving back to the beginning of logic flow 700 (A). The movement to logic flow 800 being responsive to the setting of bit [6] of CR 242 to indicate detected tampering.

Figure 8:
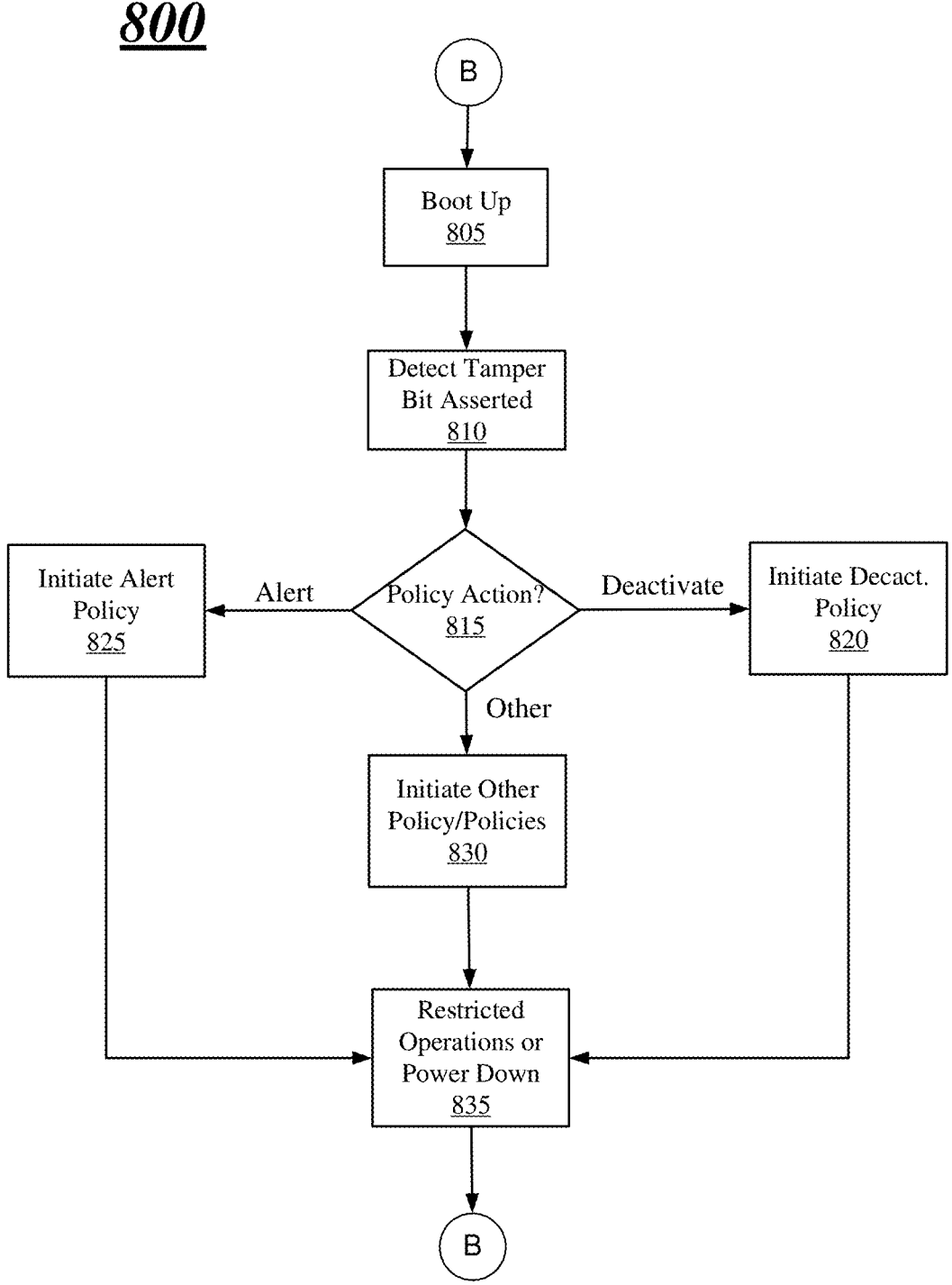
FIG. 8 illustrates an example second logic flow.

FIG. 8 illustrates an example logic flow 800. In some examples, logic flow 800 may illustrate actions by logic and/or features of a controller for a persistent memory module for which a tampering has been detected as mentioned above for logic flow 700. For these examples, similar to logic flow 700, logic flow 800 may be implemented by circuitry and/or firmware logic of a controller for a persistent memory module such as control circuitry 441 of circuitry 241 included in controller 240 as mentioned above for FIGS. 2-6.

Starting at block 805, module 200 is booted up.

Moving to block 810, control circuitry 441 may read bit [6] of CR 242 and based on bit [6] being asserted, detects that the tamper bit has been asserted.

Moving to decision block 815, control circuitry 441 determines which policy action to implement. If an alert policy action, logic flow 800 moves to block 825. If a deactivation policy, logic flow 800 moves to block 820. If other policy actions, which may include any combination of alert, deactivation, restricts or other tamper-related policies, logic flow moves to block 830.

Moving from decision block 815 to block 820, control circuitry 441 may initiate a deactivation policy that cause module 200 to become inoperable. Actions may include, preventing access to NVM devices 230-1 to 230-12 or preventing decryption of any encrypted data stored in NVM devices 230-1 to 230-12.

Moving from decision block 815 to block 825, control circuitry 441 may cause an alert to be generated. In some examples, the alert may indicate to an operator of a computing platform for which module 200 may be inserted that tampering of module 200 has been detected. For these examples, the operator may take correction actions such as removing all sensitive data from module 200 and allowing only non-sensitive data to be stored to module 200.

Moving from decision block 815 to block 830, control circuitry 441 may initiate other policy actions that may include a combination of alerting, deactivating, restricting or other tamper-related policies for use of module 200. For example, erasing at least a portion (or all) of the data stored to NVM devices 230-1 to 230-12.

Moving from either blocks 820, 825 or 835 to block 835, module 200 is powered down. In some examples, if module 200 is powered on or booted up again, logic flow 800 may be restarted.

Figure 9:
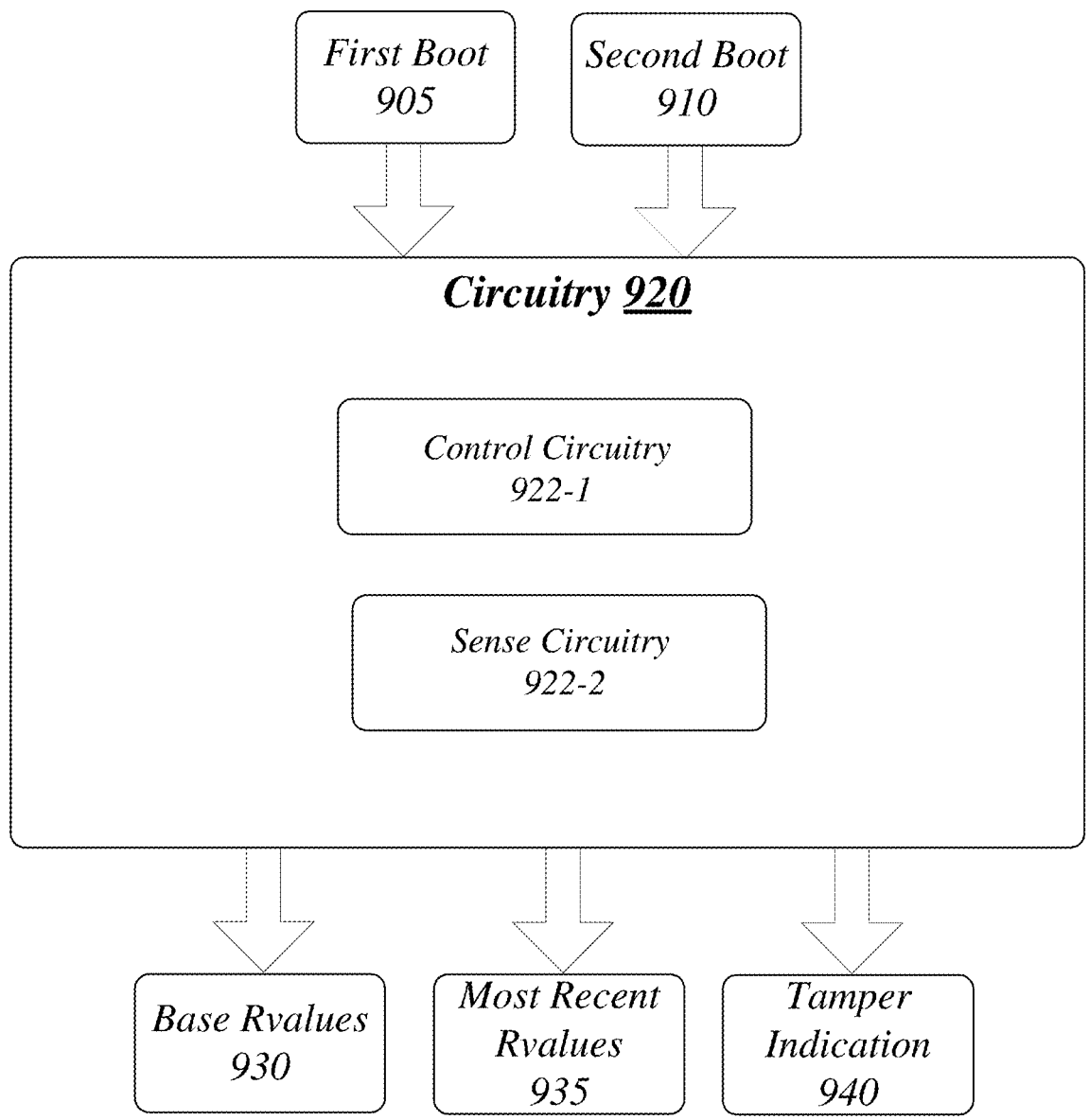
FIG. 9 illustrates an example apparatus.

FIG. 9 illustrates an example block diagram for apparatus 900. Although apparatus 900 shown in FIG. 9 has a limited number of elements in a certain topology, it may be appreciated that apparatus 900 may include more or less elements in alternate topologies as desired for a given implementation.

According to some examples, apparatus 900 may be supported by circuitry 920 of a controller such as circuitry 241 of controller 240 for a memory module such as module 200. Circuity included in circuitry 920 such as control circuitry 822-1 or sense circuitry 822-2 may be arranged to execute logic or one or more firmware implemented modules, components or features of the logic. Also, "module", "component" or "feature" may also include firmware stored in computer-readable or machine-readable media (e.g., non-volatile memory media maintained at or accessible to controller 240), and although types of circuitry are shown in FIG. 9 as discrete boxes, this does not limit these types of features to being implemented by distinct hardware components (e.g., separate application-specific integrated circuits (ASICs) or field programmable gate arrays (FPGAs)).

According to some examples, circuitry 920 may include one or more ASICs or FPGAs and, in some examples, at least some of control circuitry 922-1 or 822-2 may be implemented as hardware elements of these ASICs or FPGAs.

In some examples, as shown in FIG. 9, circuitry 920 may include control circuitry 922-1 and sense circuitry 922-2. For these examples, control circuitry 922-1 may determine, responsive to a first boot of the memory module, a first resistance value for a character pattern sprayed on a side of a heat spreader cover that faces non-volatile memory devices resident on a first side of a PCB of the memory module, wherein the character pattern is sprayed on using conductive ink. First boot 905 may indicate to control circuitry 922-1 to determine the first resistance value. Also, for these examples, sense circuitry 922-2 may sense the output current and voltage from the character pattern and provide the outputted current and voltage to enable control circuitry 922-1 to determine the first resistance value. Control circuitry 922-1 may store this first resistance value to a register accessible to circuitry 920. Base_$R_{value}$ 930, for example, may include the first resistance value stored to the register.

According to some examples, control circuitry 922-1 may determine, responsive to a second boot of the memory module, a second resistance value for the character pattern. Second boot 910 may indicate to control circuitry 922-1 to determine the second resistance value. For these examples, sense circuitry 922-2 may sense the output current and voltage from the character pattern and provide the outputted current and voltage to enable control circuitry 922-1 to determine the second resistance value. Control circuitry 922-1 may store this second resistance value to the register accessible to circuitry 920. Most recent $R_{value}$ 935, for example, may include the second resistance value stored to the register.

In some examples, control circuitry 922-1 may assert a bit of the register to indicate tampering of the memory module based on the second resistance value not matching the first resistance value within a threshold resistance value. For these examples, tamper indication 940 may indicate assertion of the bit. The bit asserted to be separate from any bits used to store the first and second resistance values to the register.

Various components of apparatus 900 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 10 illustrates an example logic flow 1000. Logic flow 1000 may be representative of some or all of the operations executed by one or more logic, features, or devices described herein, such as apparatus 900. More particularly, logic flow 1000 may be implemented by control circuitry 922-1.

According to some examples, logic flow 1000 at block 1002 may determine, following a first boot of a memory module, a first resistance value for a character pattern sprayed on a side of a heat spreader cover that faces non-volatile memory devices resident on a first side of a PCB of the memory module, the character pattern sprayed on using conductive ink. For these examples, control circuitry 922-1 determines the first resistance value.

In some examples, logic flow 1000 at block 1004 may determine, following a second boot of the memory module, a second resistance value for the character pattern. For these examples, control circuitry 922-1 determines the second resistance value.

According to some examples, logic flow 1000 at block 1006 may assert a bit of a register accessible to circuitry of a controller resident on the first side or the second side of the PCB to indicate tampering of the memory module based on the second resistance value not matching the first resistance value within a threshold resistance value. For these examples, control circuitry 922-1 may assert the bit to indicate tampering of the memory module.

FIG. 11 illustrates an example storage medium 1100. In some examples, storage medium 1100 may be an article of manufacture. Storage medium 1100 may include any non-transitory computer readable medium or machine readable medium, such as an optical, magnetic or semiconductor storage. Storage medium 1100 may store various types of computer executable instructions, such as instructions to implement logic flow 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
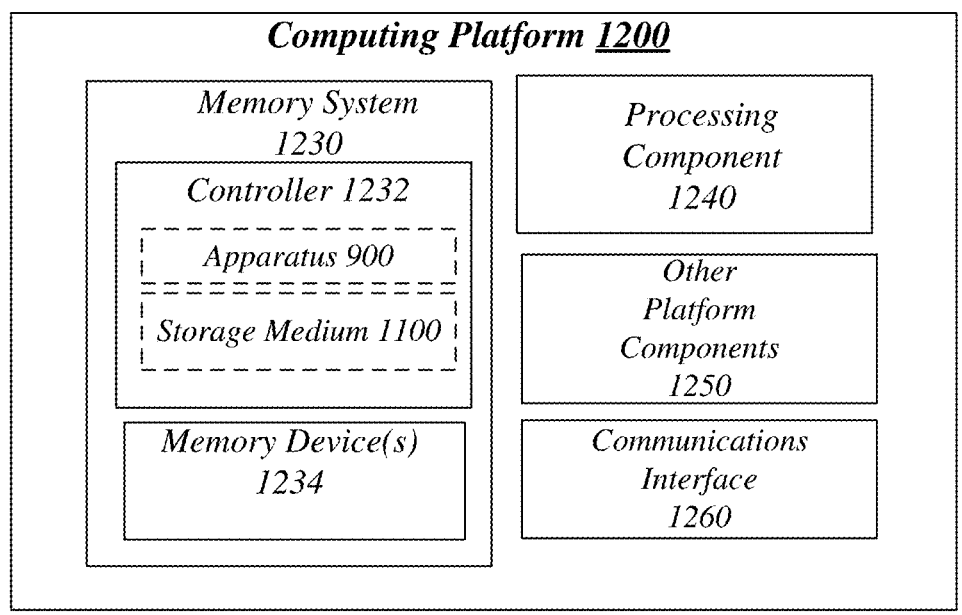
FIG. 12 illustrates an example computing platform.

FIG. 12 illustrates an example computing platform 1200. In some examples, as shown in FIG. 12, computing platform 1200 may include a memory system 1230, a processing component 1240, other platform components 1250 or a communications interface 1260. According to some examples, computing platform 1200 may be implemented in a computing device.

According to some examples, memory system 1230 may include a controller 1232 and memory device(s) 1234. For these examples, circuitry of controller 1232 may execute at least some processing operations or logic for apparatus 900 and may include storage media that includes storage medium 1100. Also, memory device(s) 1234 may include similar types of volatile or non-volatile memory (not shown) that are described above for non-volatile memory devices 230-1 to 230-12 and volatile memory device 250 shown in FIGS. 2-3.

According to some examples, Processing components 1240 may include various hardware elements, software elements, or a combination of both. Examples of hardware elements may include devices, logic devices, components, processors, microprocessors, management controllers, companion dice, circuits, processor circuits, circuit elements (e.g., transistors, resistors, capacitors, inductors, and so forth), integrated circuits, ASICs, programmable logic devices (PLDs), digital signal processors (DSPs), FPGAs, memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (APIs), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1250 may include common computing elements, memory units (that include system memory), chipsets, controllers, peripherals, interfaces, oscillators, timing devices, video cards, audio cards, multimedia input/output (I/O) components (e.g., digital displays), power supplies, and so forth. Examples of memory units or memory devices included in other platform components 1250 may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1260 may include logic and/or features to support a communication interface. For these examples, communications interface 1260 may include one or more communication interfaces that operate according to various communication protocols or standards to communicate over direct or network communication links. Direct communications may occur via use of communication protocols or standards described in one or more industry standards (including progenies and variants) such as those associated with the PCIe specification, the NVMe specification or the I3C specification. Network communications may occur via use of communication protocols or standards such those described in one or more Ethernet standards promulgated by the Institute of Electrical and Electronics Engineers (IEEE). For example, one such Ethernet standard promulgated by IEEE may include, but is not limited to, IEEE 802.3-2018, Carrier sense Multiple access with Collision Detection (CSMA/CD) Access Method and Physical Layer Specifications, Published in August 2018 (hereinafter "IEEE 802.3 specification"). Network communication may also occur according to one or more OpenFlow specifications such as the OpenFlow Hardware Abstraction API Specification. Network communications may also occur according to one or more Infiniband Architecture specifications.

Computing platform 1200 may be part of a computing device that may be, for example, user equipment, a computer, a personal computer (PC), a desktop computer, a laptop computer, a notebook computer, a netbook computer, a tablet, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 1200 described herein, may be included or omitted in various embodiments of computing platform 1200, as suitably desired.

The components and features of computing platform 1200 may be implemented using any combination of discrete circuitry, ASICs, logic gates and/or single chip architectures. Further, the features of computing platform 1200 may be implemented using microcontrollers, programmable logic arrays and/or microprocessors or any combination of the foregoing where suitably appropriate. It is noted that hardware, firmware and/or software elements may be collectively or individually referred to herein as "logic", "circuit" or "circuitry."

It should be appreciated that the exemplary computing platform 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" and may be similar to IP blocks. IP cores may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled" or "coupled with", however, may also mean that two or more elements are not in direct contact with each other, but yet still co-operate or interact with each other.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

The follow examples pertain to additional examples of technologies disclosed herein.

Example 1. An example apparatus may include a controller to reside on a printed circuit board (PCB) of a memory module. The controller may include circuitry to determine, responsive to a first boot of the memory module, a first resistance value for a character pattern sprayed on a side of a heat spreader cover that faces non-volatile memory devices resident on a first side of the PCB, wherein the character pattern is to be sprayed on using conductive ink. The circuitry may also determine, responsive a second boot of the memory module, a second resistance value for the character pattern. The circuitry may also assert a bit of a register accessible to the circuitry to indicate tampering of the memory module based on the second resistance value not matching the first resistance value within a threshold resistance value.

Example 2. The apparatus of example 1, the circuitry may also store the first resistance value to a first set of bits of the register accessible to the circuitry of the controller. The circuitry may also store the second resistance value to a second set of bits of the register, wherein the first and second set of bits do not include the bit asserted to indicate tampering of the memory module.

Example 3. The apparatus of example 2, the circuitry may also convert the first resistance value to a first digital formatted number and store the first digital formatted number to the first set of bits of the register. The circuitry may also convert the second resistance value to a second digital formatted number and store the second digital formatted number to the second set of bits of the register.

Example 4. The apparatus of example 1, the circuitry may also detect, responsive to a third boot of the memory module, the asserted bit of the register that indicates tampering of the memory module. The circuitry may also initiate a tamper policy that includes a policy to deactivate the memory module, a policy to generate an alert to a user of the memory module that tampering was detected, a policy that prevents decryption of encrypted data stored in the non-volatile memory devices, or a policy that erases at least a portion of data stored in the non-volatile memory devices.

Example 5. The apparatus of example 1, the circuitry may also cause a tamper indication to be stored in a physical memory address of at least one of the non-volatile memory devices or cause a programmable fuse bit to be activated to indicate tampering of the memory module.

Example 6. The apparatus of example 1, the character pattern may include a per-module unique character pattern sprayed on the heat spreader using the conductive ink in a pattern that connects characters to enable a current to flow through the conductive ink from an input contact on the heat spreader cover to an output contact on the heat spreader cover.

Example 7. The apparatus of example 1, the conductive ink may include a carbon ink, a conductive polymer ink, or metal nanoparticle ink.

Example 8. The apparatus of example 1, the memory module may be a dual in-line memory module (DIMM) that also includes second non-volatile memory devices resident on a second side of the PCB and a second heat spreader cover that has a second character pattern sprayed on a side of the second heat spreader that faces the second non-volatile memory devices, wherein the second character pattern is sprayed using conductive ink.

Example 9. The apparatus of example 8, the circuitry to determine the first resistance value and the second resistance value may further include the circuitry to determine, responsive to the first boot of the memory module, the first resistance value based on resistance values of the character pattern and the second character pattern. The circuitry may also determine, responsive to the second boot of the memory module, the second resistance value based on resistance values of the character pattern and the second character pattern.

Example 10. The apparatus of example 1, the non-volatile memory devices may include a byte or block addressable type of non-volatile memory having a 3-dimensional (3-D) cross-point memory structure that includes chalcogenide phase change material.

Example 11. The apparatus of example 1, the first boot of the memory module may include an initial boot of the memory module following assembly of the memory module at a manufacturer.

Example 12. An example method may include determining, following a first boot of a memory module, a first resistance value for a character pattern sprayed on a side of a heat spreader cover that faces non-volatile memory devices resident on a first side of a printed circuit board (PCB) of the memory module, wherein the character pattern is sprayed on using conductive ink. The method may also include determining, following a second boot of the memory module, a second resistance value for the character pattern. The method may also include asserting a bit of a register accessible to circuitry of a controller resident on the first side or a second side of the PCB to indicate tampering of the memory module based on the second resistance value not matching the first resistance value within a threshold resistance value.

Example 13. The method of example 12 may also include storing the first resistance value to a first set of bits of the register accessible to the circuitry of the controller. The method may also include storing the second resistance value to a second set of bits of the register, wherein the first and second set of bits do not include the bit asserted to indicate tampering of the memory module.

Example 14. The method of example 13, may also include converting the first resistance value to a first digital formatted number and storing the first digital formatted number to the first set of bits of the register. The method may also include converting the second resistance value to a second digital formatted number and store the second digital formatted number to the second set of bits of the register.

Example 15. The method of example 12, may also include detecting, following a third boot of the memory module, the asserted bit of the register that indicates tampering of the memory module. The method may also include initiating a tamper policy that includes a policy to deactivate the memory module, a policy to generate an alert to a user of the memory module that tampering was detected, a policy that prevents decryption of encrypted data stored in the non-volatile memory devices, or a policy that erases at least a portion of data stored in the non-volatile memory devices.

Example 16. The method of example 15 may also include causing a tamper indication to be stored in a physical memory address of at least one of the non-volatile memory devices or causing a programmable fuse bit to be activated to indicate tampering of the memory module.

Example 17. The method of example 12, the character pattern may include a per-module unique character pattern sprayed on the heat spreader using the conductive ink in a pattern that connects characters to enable a current to flow through the conductive ink from an input contact on the heat spreader cover to an output contact on the heat spreader cover.

Example 18. The method of example 12, the conductive ink may include a carbon ink, a conductive polymer ink, or metal nanoparticle ink.

Example 19. The method of example 12, the memory module may include a dual in-line memory module (DIMM) that also includes second non-volatile memory devices resident on a second side of the PCB and a second heat spreader cover that has a second character pattern sprayed on a side of the second heat spreader that faces the second non-volatile memory devices, wherein the second character pattern is sprayed using conductive ink.

Example 20. The method of example 19, determining the first resistance value and the second resistance value may include determining, following the first boot of the memory module, the first resistance value based on resistance values of the character pattern and the second character pattern. The method may also include determining, following the second boot of the memory module, the second resistance value based on resistance values of the character pattern and the second character pattern.

Example 21. The method of example 12, the non-volatile memory devices may include a byte or block addressable type of non-volatile memory having a 3-dimensional (3-D) cross-point memory structure that includes chalcogenide phase change material.

Example 22. The method of example 12, the first boot of the memory module may include an initial boot of the memory module following assembly of the memory module at a manufacturer.

Example 23. An example at least one machine readable medium may include a plurality of instructions that in response to being executed by a system may cause the system to carry out a method according to any one of examples 12 to 22.

Example 24. An example apparatus may include means for performing the methods of any one of examples 12 to 22.

Example 25. An example dual in-line memory module (DIMM) may include a printed circuit board (PCB). The DIMM may also include a first non-volatile memory devices resident on a first side of the PCB. The DIMM may also include a second non-volatile memory devices resident on a second side of the PCB. The DIMM may also include a first heat spreader cover having a first character pattern sprayed on a side facing the first non-volatile memory devices. The first character pattern may be sprayed on using conductive ink. The DIMM may also include a second heat spreader cover having a second character pattern sprayed on a side facing the second non-volatile memory devices. The second character pattern may be sprayed on using conductive ink. The DIMM may also include a controller resident on the first side of the PCB. The controller may include circuitry to determine, responsive to a first boot of the DIMM, a first resistance value for the first and second character patterns.

The circuitry may also determine, responsive to a second boot of the DIMM, a second resistance value for the character pattern. The circuitry may also assert a bit of a register accessible to the circuitry to indicate tampering of the DIMM based on the second resistance value not matching the first resistance value within a threshold resistance value.

Example 26. The DIMM of example 25, may also include the circuitry to store the first resistance value to a first set of bits of the register accessible to the circuitry. The circuitry may also store the second resistance value to a second set of bits of the register, wherein the first and second set of bits do not include the bit asserted to indicate tampering of the DIMM.

Example 27. The DIMM of example 26, may also include the circuitry to convert the first resistance value to a first digital formatted number and store the first digital formatted number to the first set of bits of the register. The circuitry may also convert the second resistance value to a second digital formatted number and store the second digital formatted number to the second set of bits of the register.

Example 28. The DIMM of example 25, may also include the circuitry to detect, following a third boot of the DIMM, the asserted bit of the register that indicates tampering of the DIMM. The circuitry may also initiate a tamper policy that includes a policy to deactivate the DIMM, a policy to generate an alert to a user of the DIMM that tampering was detected, a policy that prevents decryption of encrypted data stored in the first or second non-volatile memory devices, or a policy that erases at least a portion of data stored in the first or second non-volatile memory devices.

Example 29. The DIMM of example 28 may also include the circuitry to cause a tamper indication to be stored in a physical memory address of at least one of the non-volatile memory devices or cause a programmable fuse bit to be activated to indicate tampering of the memory module.

Example 30. The DIMM of example 25, the character pattern may include a per-DIMM unique character pattern sprayed on the first and second heat spreaders using the conductive ink in separate patterns that connect characters to enable currents to flow through the conductive ink from respective input contacts on the first heat spreader cover and the second heat spreader cover to respective output contacts on the first heat spreader cover and the second heat spreader cover.

Example 31. The DIMM of example 25, conductive ink may include a carbon ink, a conductive polymer ink, or metal nanoparticle ink.

Example 32. The DIMM of example 25, the first and second non-volatile memory device may include byte or block addressable types of non-volatile memory having a 3-dimensional (3-D) cross-point memory structure that includes chalcogenide phase change material.

Example 33. The DIMM of example 25, the first boot of the DIMM may include an initial boot of the DIMM following assembly of the DIMM at a manufacturer.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a controller to reside on a printed circuit board (PCB) of a memory module, the controller to include circuitry to:
determine, responsive to a first boot of the memory module, a first resistance value for a character pattern sprayed on a side of a heat spreader cover that faces non-volatile memory devices resident on a first side of the PCB, wherein the character pattern is to be sprayed on using conductive ink;
determine, responsive to a second boot of the memory module, a second resistance value for the character pattern; and
assert a bit of a register accessible to the circuitry to indicate tampering of the memory module based on the second resistance value not matching the first resistance value within a threshold resistance value.

2. The apparatus of claim 1, further comprising the circuitry to:
store the first resistance value to a first set of bits of the register accessible to the circuitry of the controller; and
store the second resistance value to a second set of bits of the register, wherein the first and the second set of bits do not include the bit asserted to indicate tampering of the memory module.

3. The apparatus of claim 2, further comprising the circuitry to:
convert the first resistance value to a first digital formatted number and store the first digital formatted number to the first set of bits of the register; and
convert the second resistance value to a second digital formatted number and store the second digital formatted number to the second set of bits of the register.

4. The apparatus of claim 1, further comprising the circuitry to:
detect, responsive to a third boot of the memory module, the asserted bit of the register that indicates tampering of the memory module; and
initiate a tamper policy that includes a policy to deactivate the memory module, a policy to generate an alert to a user of the memory module that tampering was detected, a policy that prevents decryption of encrypted data stored in the non-volatile memory devices, or a policy that erases at least a portion of data stored in the non-volatile memory devices.

5. The apparatus of claim 1, further comprising the circuitry to:
cause a tamper indication to be stored in a physical memory address of at least one of the non-volatile memory devices or cause a programmable fuse bit to be activated to indicate tampering of the memory module.

6. The apparatus of claim 1, the character pattern comprises a per-module unique character pattern sprayed on the heat spreader using the conductive ink in a pattern that connects characters to enable a current to flow through the conductive ink from an input contact on the heat spreader cover to an output contact on the heat spreader cover.

7. The apparatus of claim 1, the conductive ink comprising a carbon ink, a conductive polymer ink, or metal nanoparticle ink.

8. The apparatus of claim 1, the memory module comprising a dual in-line memory module (DIMM) that also includes second non-volatile memory devices resident on a second side of the PCB and a second heat spreader cover that has a second character pattern sprayed on a side of the second heat spreader that faces the second non-volatile memory devices, wherein the second character pattern is sprayed using conductive ink.

9. The apparatus of claim 8, the circuitry to determine the first resistance value and the second resistance value further comprises the circuitry to:
determine, responsive to the first boot of the memory module, the first resistance value based on resistance values of the character pattern and the second character pattern; and
determine, responsive to the second boot of the memory module, the second resistance value based on resistance values of the character pattern and the second character pattern.

10. The apparatus of claim 1, the non-volatile memory devices comprising a byte or block addressable type of non-volatile memory having a 3-dimensional (3-D) cross-point memory structure that includes chalcogenide phase change material.

11. The apparatus of claim 1, the first boot of the memory module comprising an initial boot of the memory module following assembly of the memory module at a manufacturer.

12. A method comprising:
determining, following a first boot of a memory module, a first resistance value for a character pattern sprayed on a side of a heat spreader cover that faces non-volatile memory devices resident on a first side of a printed circuit board (PCB) of the memory module, wherein the character pattern is sprayed on using conductive ink;
determining, following a second boot of the memory module, a second resistance value for the character pattern; and
asserting a bit of a register accessible to circuitry of a controller resident on the first side or a second side of the PCB to indicate tampering of the memory module based on the second resistance value not matching the first resistance value within a threshold resistance value.

13. The method of claim 12, further comprising:
storing the first resistance value to a first set of bits of the register accessible to the circuitry of the controller; and
storing the second resistance value to a second set of bits of the register, wherein the first and the second set of bits do not include the bit asserted to indicate tampering of the memory module.

14. The method of claim 12, further comprising:
detecting, following a third boot of the memory module, the asserted bit of the register that indicates tampering of the memory module; and initiating a tamper policy that includes a policy to deactivate the memory module, a policy to generate an alert to a user of the memory module that tampering was detected, a policy that prevents decryption of encrypted data stored in the non-volatile memory devices, or a policy that erases at least a portion of data stored in the non-volatile memory devices.

15. The method of claim 12, the character pattern comprises a per-module unique character pattern sprayed on the heat spreader using the conductive ink in a pattern that connects characters to enable a current to flow through the conductive ink from an input contact on the heat spreader cover to an output contact on the heat spreader cover.

16. The method of claim 12, the memory module comprising a dual in-line memory module (DIMM) that also includes second non-volatile memory devices resident on a second side of the PCB and a second heat spreader cover that has a second character pattern sprayed on a side of the second heat spreader that faces the second non-volatile memory devices, wherein the second character pattern is sprayed using conductive ink.

17. The method of claim 16, determining the first resistance value and the second resistance value further comprising:
determining, following the first boot of the memory module, the first resistance value based on resistance values of the character pattern and the second character pattern; and
determining, following the second boot of the memory module, the second resistance value based on resistance values of the character pattern and the second character pattern.

18. The method of claim 12, the first boot of the memory module comprising an initial boot of the memory module following assembly of the memory module at a manufacturer.

19. A dual in-line memory module (DIMM) comprising:
a printed circuit board (PCB);
first non-volatile memory devices resident on a first side of the PCB;
second non-volatile memory devices resident on a second side of the PCB;
a first heat spreader cover having a first character pattern sprayed on a side facing the first non-volatile memory devices, wherein the first character pattern is to be sprayed on using conductive ink;
a second heat spreader cover having a second character pattern sprayed on a side facing the second non-volatile memory devices, wherein the second character pattern is to be sprayed on using conductive ink; and
a controller resident on the first side of the PCB, the controller to include circuitry to:
determine, responsive to a first boot of the DIMM, a first resistance value for the first and second character patterns;
determine, responsive to a second boot of the DIMM, a second resistance value for the first and second character patterns; and
assert a bit of a register accessible to the circuitry to indicate tampering of the DIMM based on the second resistance value not matching the first resistance value within a threshold resistance value.

20. The DIMM of claim 19, further comprising the circuitry to:
store the first resistance value to a first set of bits of the register accessible to the circuitry; and
store the second resistance value to a second set of bits of the register, wherein the first and the second set of bits do not include the bit asserted to indicate tampering of the DIMM.

21. The DIMM of claim 19, further comprising the circuitry to:
detect, following a third boot of the DIMM, the asserted bit of the register that indicates tampering of the DIMM; and
initiate a tamper policy that includes a policy to deactivate the DIMM, a policy to generate an alert to a user of the DIMM that tampering was detected, a policy that prevents decryption of encrypted data stored in the first or second non-volatile memory devices, or a policy that erases at least a portion of data stored in the first or second non-volatile memory devices.

22. The DIMM of claim 19, the character pattern comprises a per-DIMM unique character pattern sprayed on the first and second heat spreaders using the conductive ink in separate patterns that connect characters to enable currents to flow through the conductive ink from respective input contacts on the first heat spreader cover and the second heat spreader cover to respective output contacts on the first heat spreader cover and the second heat spreader cover.

23. The DIMM of claim 19, conductive ink comprising a carbon ink, a conductive polymer ink, or metal nanoparticle ink.

24. The DIMM of claim 19, comprising the first and second non-volatile memory devices to include byte or block addressable types of non-volatile memory having a 3-dimensional (3-D) cross-point memory structure that includes chalcogenide phase change material.

25. The DIMM of claim 19, the first boot of the DIMM comprising an initial boot of the DIMM following assembly of the DIMM at a manufacturer.

* * * * *